United States Patent [19]

Hadzimahalis

[11] 3,984,180

[45] Oct. 5, 1976

[54] COOLING SYSTEM FOR AN AUDIO VISUAL DEVICE

[75] Inventor: Theodore M. Hadzimahalis, Libertyville, Ill.

[73] Assignee: Bell & Howell Company, Chicago, Ill.

[22] Filed: Jan. 9, 1975

[21] Appl. No.: 539,775

[52] U.S. Cl. ............................ 352/146; 352/202
[51] Int. Cl.² .................................... G03B 21/16
[58] Field of Search .......................... 352/146, 202

[56] References Cited
UNITED STATES PATENTS

| 2,135,500 | 11/1938 | Foster | 352/202 |
| 2,449,713 | 9/1948 | Nemeth | 352/202 |
| 3,408,138 | 10/1968 | Harz | 352/146 |

*Primary Examiner*—Monroe H. Hayes
*Attorney, Agent, or Firm*—Robert Schneider; John R. Hoffman; Roger M. Fitz-Gerald

[57] ABSTRACT

A chassis for a motion picture projector which includes an audio amplifier portion for producing an audio signal related to the images on the film. The chassis mounts the mechanical and electrical components of the projector. The chassis is a unitary casted structure which includes mounting platforms for the amplifier and the transformer, and an air flow directing means for more effectively and efficiently cooling of the electrical components to provide a lower operating temperature for the projector. A plurality of fins are provided on the chassis for conducting heat away from the transformer and a plurality of slots are provided to cause air flow directly across the amplifier section. A pair of depending, toothed flanges are provided on opposite ends of the chassis for introducing air onto the fins and through the slots to the heated electrical components. After passing across the electrical components, the air is directed by a fan across the high wattage, incandescent lamp and out through the top of the projector. One side of the projector housing includes air inlet slots to provide additional cooling air for the transformer.

2 Claims, 5 Drawing Figures

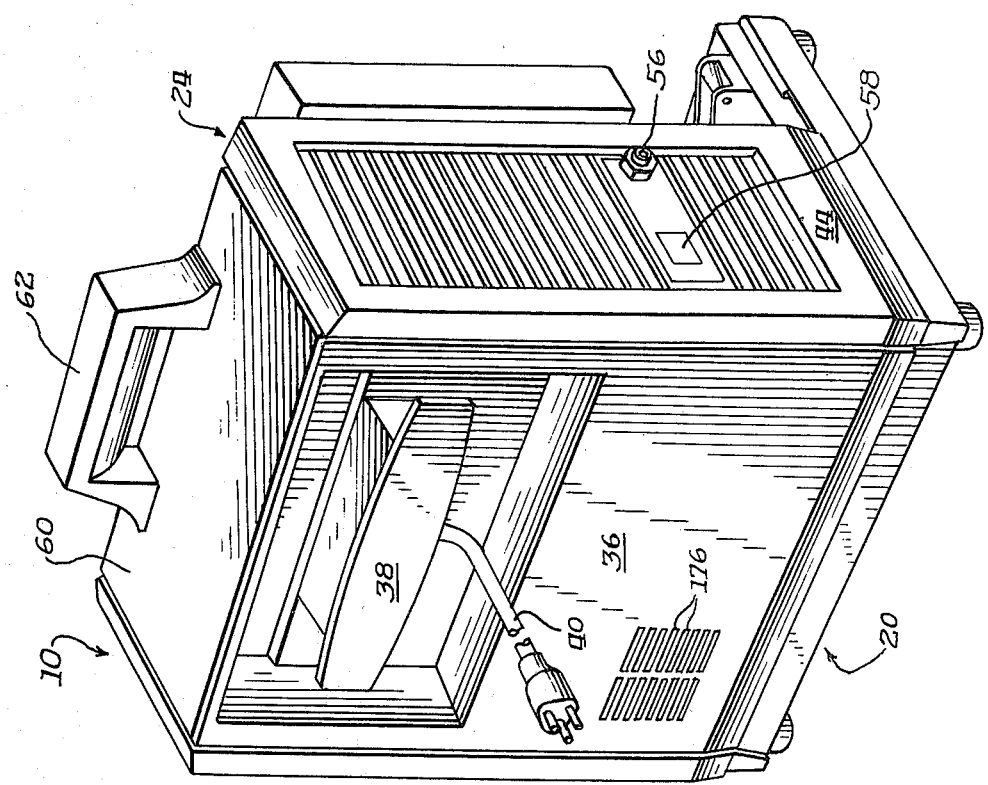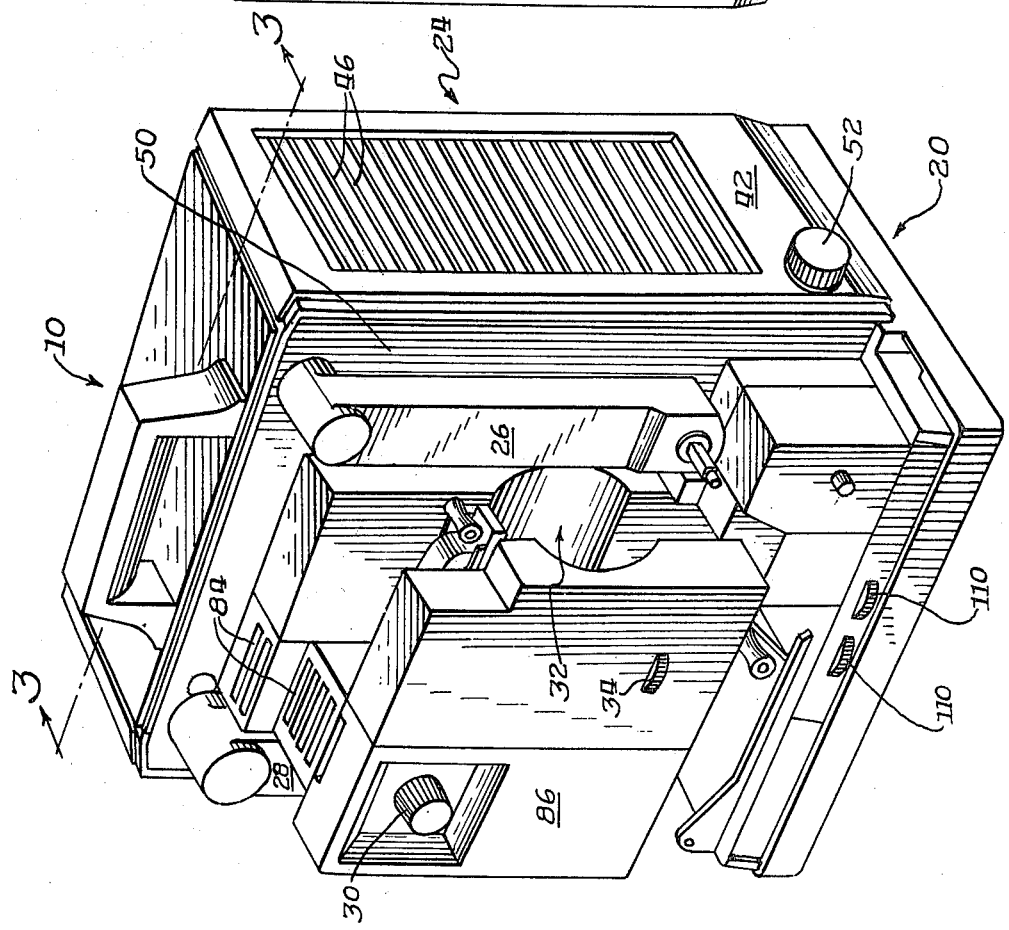

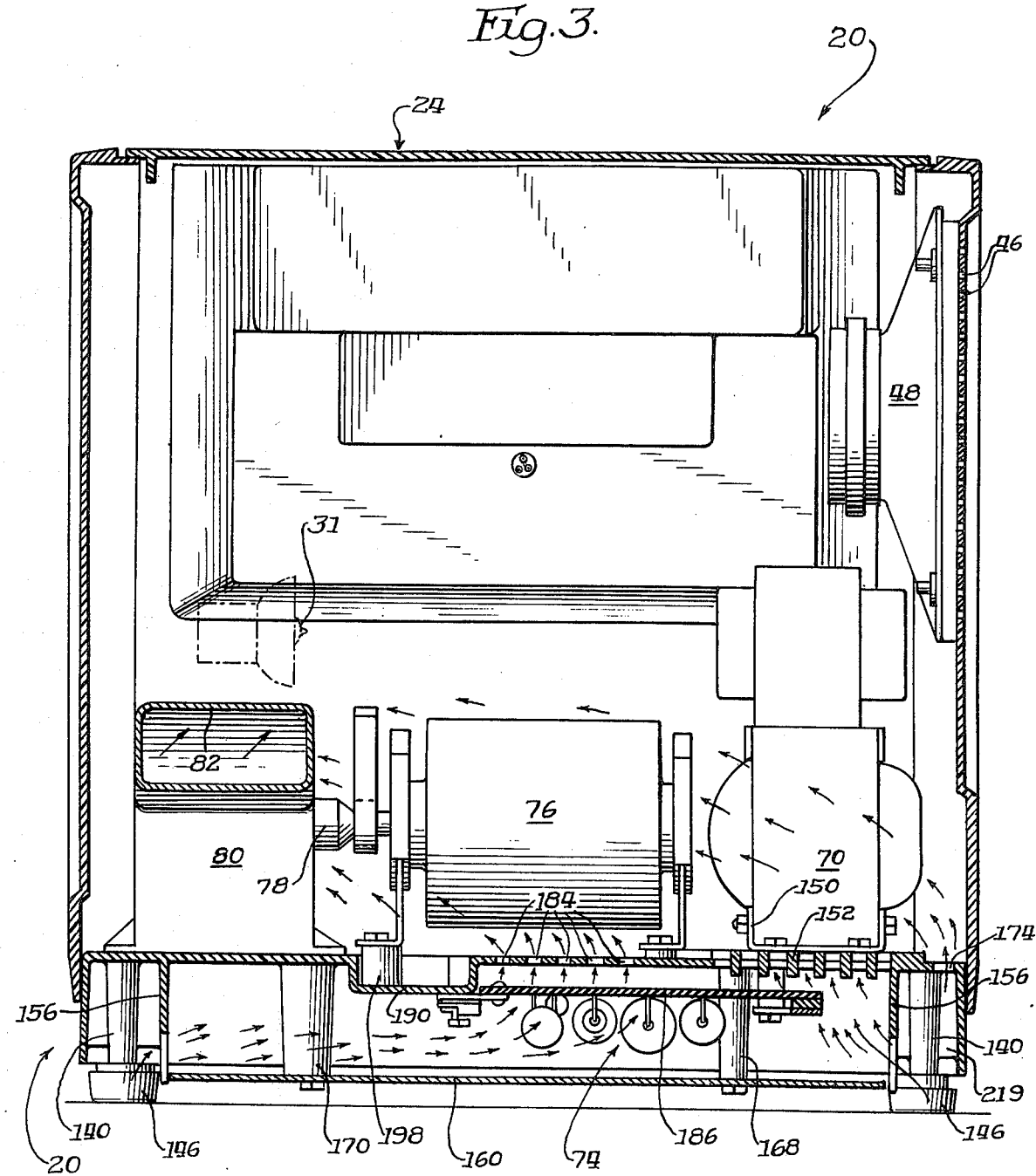

3,984,180

COOLING SYSTEM FOR AN AUDIO VISUAL DEVICE

BACKGROUND AND SUMMARY OF THE INVENTION

This invention relates to a motion picture projector for projectng a movie accompanied by a sound track. More particularly, this invention relates to an improved unitary chassis system which causes the projector to have a lower, internal operating temperature.

Many movie picture projectors have been produced which permit a movie to be shown with an audio track on the film to provide accompanying sound for the movie. In the past the particular placement of the electrical components which operate at a relatively high temperature, namely the transformer and the amplifier, was not considered to be an important criteria as far as the operating temperature of the projector was concerned. This was true primarily because of the fact that the incandescent light source is the major item which contributes to a high operating temperature for the projector. The electrical components were designed and placed within the projector cabinet at any convenient location. The disadvantage to this practice is that, although the amount of heat contributed by the electrical components is relatively small compared to the light source, they nevertheless cause a higher operating temperature of the overall projector.

In the present invention, cool air is drawn into the projector from the external environment, first across the electrical components (amplifier, transformer and motor) and thereafter across the light source and back into the environment. This design permits for the use of the largest possible temperature gradient between the electrical components and the air to more effectively cool these components. While the air is thus slightly heated before impinging the light source, the light source operates at such a high temperature level that the temperature gradient is not significantly affected. However, the cumulative effect of cooling the electrical components with the same air which is used to cool the light source is to provide a motion picture projector which operates at a temperature level considerably cooler than would have resulted without the aforementioned directed air flow.

An object of the present invention is to provide a single, unitarily casted chassis which mounts the electrical components in a path of air flow so that the overall operating temperature of the device is decreased, which thereby provides for a more economical projector requiring less servicing for components which wear out at a faster rate due to the high operating temperature.

In accordance with the present invention, a unitarily casted chassis is provided for relocating and mounting the major electrical and mechanical components of the film projector.

A pair of depending toothed flanges permit cool air from the surrounding environment to enter the projector from beneath the base. Additional air inlet slots are provided in a wall of the projector housing for cooling the transformer. The chassis also includes a plurality of fins in the path of air flow for directing heated air away from the transformer, and a plurality of slots which provide increased air flow across the amplifier components. Thereafter the air is directed across and cools the light source and from there flows out of the top of the projector.

BRIEF DESCRIPTION OF THE DRAWINGS

FIG. 1 is a front perspective view of the movie projector, with the dust cover removed, utilizing the unitary chassis of the present invention;

FIG. 2 is a rear perspective view of the movie projector of FIG. 1;

FIG. 3 is a vertical section, on an enlarged scale, of the projector taken generally along the line 3—3 of FIG. 1 including a phantom representation of the light source;

DESCRIPTION OF THE PREFERRED EMBODIMENT

Figure 4:
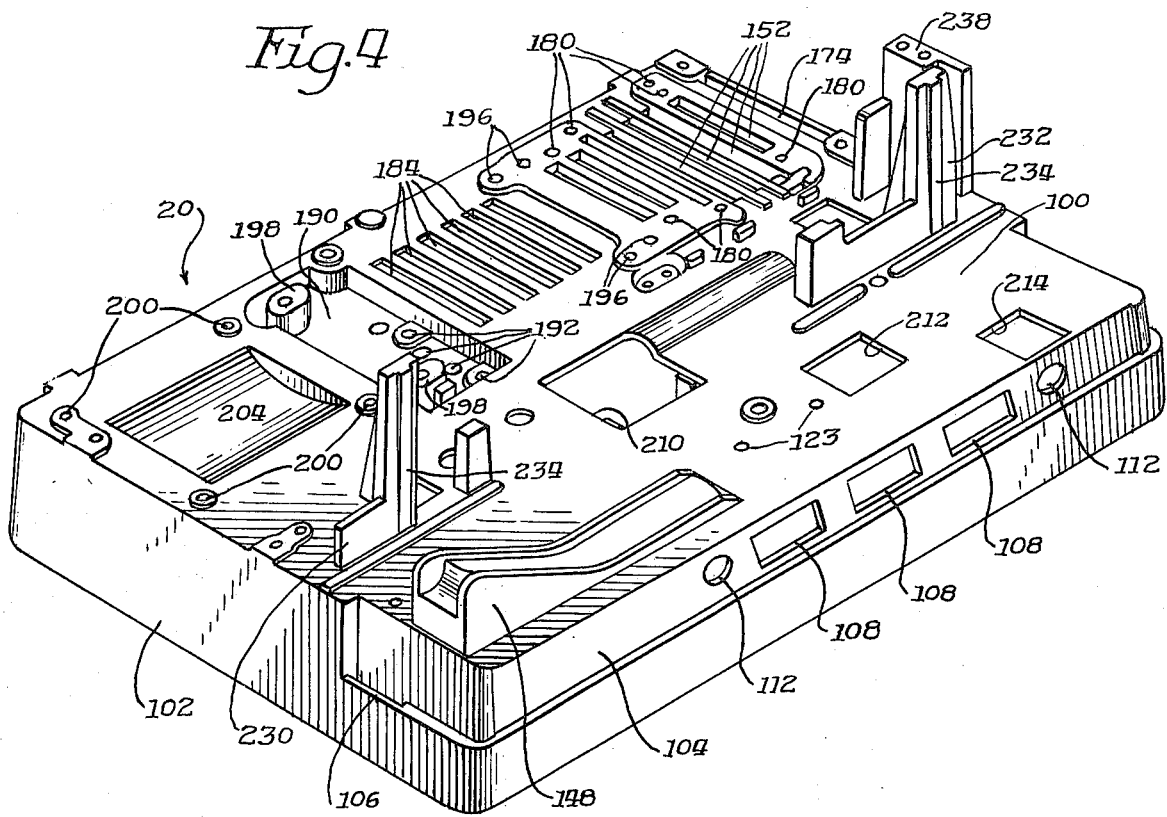
FIG. 4 is a top perspective view of the molded chassis, with the mechanical and electrical parts of the projector removed to show the details of the chassis.

Referring to FIGS. 1 and 2, a movie projector, generally designated 10, is shown utilizing a chassis, generally designated 20 (FIGS. 4 and 5) of the present invention, and a housing or cabinet, generally designated 24. The projector includes a pivotally mounted reel support arm 26 for mounting a roll of movie film for feeding film to the projecting components. A second pivotally mounted reel support arm 28 mounts a take-up reed for receiving the movie film after it is projected. The arms 26 and 28 are pivotally mounted to permit folding to a storage position as shown in FIGS. 1 and 2. The projector 10 includes a mode control switch 30 which permits the film to be transported through the projector in a forward or reverse direction independently of the illumination of the light source shown in phantom as 31 in FIG. 3. A lens assembly (not shown) is mounted within a cavity 32 in front of a projection aperture (not shown) formed in front of the light source 31. A thumb wheel 34 is provided to move the lens assembly for focusing. A dust cover (not shown) fits over the left side of the projector 10 as viewed in FIG. 1.

Referring to FIG. 2, the side of the housing 36, opposite the dust cover, includes a T-bar 38 upon which a power supply cord 40 can be wrapped for storage. The side wall 36 is appropriately mounted to a front wall 42 and a rear wall 44, as by screws, so that it may be easily removed for servicing the projector. The front wall 42 includes a plurality of slots or louvers 46 (FIG. 3) which permit the escapement of sound from a speaker cone 48 mounted therebehind. The front wall 42 is mounted to the chassis 20 and to a generally vertical mounting web 50. A height-adjustment knob 52 is mounted on the front wall 42 for adjusting the attitude of the projector 10. The front wall 42 is appropriately mounted to the chassis 20 and the web 50, as by screws, so that it may also be easily removed for servicing the projector. The rear wall 44 is similarly mounted to the chassis 20 and the web 50 so that it may be easily removed. The rear wall 44 includes an 8 ohm speaker or head phone jack 56 and a multi-connector jack 58 which facilitates connection to a remote control unit (not shown).

A top wall 60 mounts a carrying handle 62 to facilitate carrying of the projector 10. The top wall 60 is appropriately mounted to the web 50 and includes a flange which fits under the side wall 36.

Referring to FIG. 3, the location of the relevant electrical components can be seen, particularly, a transformer 70 and an amplifier, generally designated 74. A drive motor 76 is mounted adjacent and rearwardly of the transformer 70 and is connected by a shaft 78 to a radial flow type fan within a squirrel cage type fan housing 80. The fan housing 80 includes an upwardly canted rectangular aperture 82 which directs air upwardly onto the light source and out through a plurality of louvers 84 (FIG. 1) provided on a light source cover plate 86. The amplifier 74, the transformer 70 and the drive motor 76 are cooled first by external air which thereafter is used to cool the incandescent light source. As noted above, this arrangement permits more effective cooling of the projector. In other words, the cool environment air is used first to cool the electrical components which operate at a temperature which is significantly lower than that of the light source. However, since the light source operates at such a high temperature, this slight heating of air does not significantly affect its ability to cool the light source. In practice, this system has proved to cool a projector as shown herein by as much as 12° cooler than heretofore effected. Additional cooling air were required on additional opening under the fan could be provided.

Figure 5:
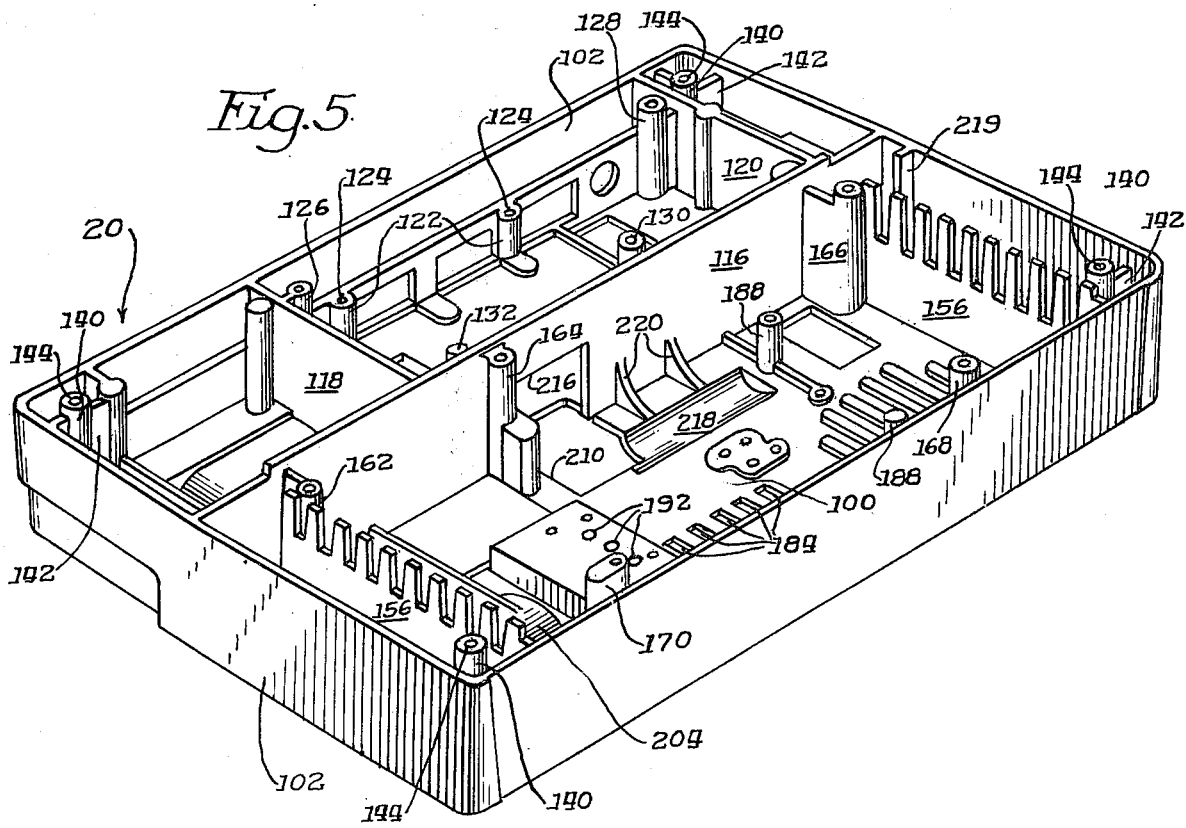
FIG. 5 is a bottom perspective view of the chassis, again with the mechanical and electrical components removed to show the details of the chassis.

Referring now to FIGS. 4 and 5, the unitarily molded chassis 20 is shown with all of the electrical and mechanical components removed. The chassis 20 includes a generally flat, horizontal deck 100 which is molded integrally with a depending flange or skirt 102 about the entire periphery of the deck. The flange 102 includes a setback portion 104 along one side to provide a flush fit between the dust cover and the flange. The dust cover includes two depending flanges (not shown) which mate with a pair of detents 106 on either end of the setback portion 104. A plurality of rectangular apertures 108 are provided in the face of the offset portion to provide access to a plurality of control knobs 110 (FIG. 1). Adjacent either end of the apertures 108 is a circular aperture 112 which may be used for additional controls, as for example when the projector is adapted for use in European countries having a different electrical standard than that used in the United States.

Referring to FIG. 5, a transverse central support rib 116 is provided to add rigidity to the deck 100. Additionally, a pair of short ribs 118 and 120 extend from the central rib 116 to the flange 102 and provide a cavity adjacent the control knob apertures 108 and 112 for mounting the electrical control elements. The electrical control elements are mounted by a bracket a printed circuit board as may be used in European countries (not shown) to the chassis 20 by a pair of integrally molded posts 122 and a pair of apertures 123 (FIG. 4) formed in the deck 100. Each post 122 includes a threaded bore 124 and the apertures 123 are tapped to accept a fastening screw for mounting the control bracket. Similarly, four internally threaded posts 126, 128, 130 and 132 mount a generally rectangular cover plate beneath the control elements. The posts 126 through 132 are substantially longer than the posts 124 and therefore will support the cover plate beneath the control elements. The mounting posts 126 and 128 are integrally molded with the ribs 118 and 120, respectively, adjacent the recessed portion 104 of the flange 102 while the posts 130 and 132 are mounted adjacent the transverse rib 116.

Each corner of the chassis includes a post 140 which is supported by an L-shaped flange 142 connecting the posts 140 to the adjacent walls of the flange 102. The posts 140 each include a threaded bore 144 for screw mounting a flexible, rubber support cushion 146 (FIG. 3). One corner of the chassis 20 includes a film guide 148 (FIG. 4) which is integrally molded on the top of the deck 100. This film guide provides a ramp for directing film which has been projected onto the take-up reel in the back of the projector.

The remainder of the chassis as shown on the top in FIG. 4 is seen in section in FIG. 3. This portion mounts the transformer 70, the amplifier 74, the motor 76 and the fan housing 80, as described below.

More particularly, the transformer 70 is mounted by a U-shaped bracket 150 (FIG. 3) to a plurality of thickened, spaced apart, ribs or fins 152 (FIGS. 3 and 4) which serve to conduct the heat generated by the transformer into the path of air flow. The cooling air enters the projector from below the chassis. Referring to FIG. 5, a pair of slotted or toothed depending flanges 156 are mounted between the center rib 116 and the right side flange 102 of the base to create an air inlet for cooling external air. A second cover plate 160 (FIG. 3) is mounted on the bottom of the chassis 20 by five integrally molded posts 162, 164, 166, 168 and 170. The plate 160 mounts so that its ends are adjacent the slotted flanges 156 so that inlet air passes through the slots in the flanges 156. A portion of this cool air is drawn across and between the fins 152 and over the transformer 70 to cool it. Another slot 174 (FIG. 3) is provided forwardly of the front flange 156 to provide an additional inlet for air which passes directly over the transformer 70. The air flow is shown best in FIG. 3 by the numerous unnumbered arrows.

Also, referring to FIG. 2, a plurality of slots or louvers 176 are provided in the right side cover 36 adjacent the transformer 70 to permit additional cooling air to enter through the side of the housing to provide further cooling air directly to the surfaces of the transformer 70. All of this inlet air is then drawn by the fan across the motor 76 to additionally cool the motor before the air is directed by the fan onto the light source. A plurality of holes 180 are provided on opposite sides of the fins 152 for mounting the transformer bracket 150. Although only four of the holes are threaded for mounting a particular transformer 70, additional holes are provided so that several different transformers can be used to accommodate the power source of the particular country in which the projector is used.

Referring again to FIGS. 3 and 4, a plurality of louvers or slots 184 rearwardly of the fins 152 are provided which cause cool air to be drawn in through the rearward slotted flange 156 and pass over the amplifier 74 to thereby cool the amplifier. The components of the amplifier 74 are mounted on a non-conductive board 186 in the path of air flow. The board 186 is mounted at its forward end on a pair of depending posts 188 and at its rearward end on the surface of a recess 190. The recess 190 includes a plurality of mounting apertures 192 to again accommodate the use of one of several available amplifiers. The motor 76 is mounted directly above the slots 184 by a plurality of holes 196 provided at the forward portion of the slots 184 and a pair of posts 198 provided in the recess 190 (FIG. 4).

Thus the cool air which is drawn across the amplifier 74 is also drawn upwardly across the motor 76 and then to the fan which directs it onto the light source. The fan housing 80 is mounted rearwardly of the motor in a plurality of threaded apertures 200 formed in the deck 100. A semi-cylindrical recess 204 is provided in the deck 100 to conform the deck to the configuration of the squirrel cage radial type fan blower.

Referring again to the top of the chassis 20 in FIG. 4, three generally square access holes 210, 212, and 214 are provided in the deck to permit electrical wiring from the amplifier to the transformer and for clearance for other electrical wiring. Below the access hole 210 another access hole 216 is provided in the transverse flange 116 to permit wiring to the electrical controls. Referring to FIG. 5, adjacent the clearance hole 210, the chassis 20 is provided with a semi-cylindrical capacitor recess 218 which permits substantially flush mounting of a capacitor to permit good heat transfer to the chassis 20. A pair of generally triangular flanges are provided adjacent the capacitor recess to strengthen that portion of the deck 100. A rib 219 provides stability to the tilt foot rod as described hereinafter. The remaining, apparently dead end posts, located within flanges, and the like, are not necessary or critical in the design of the chassis 20 but occur and are necessary in the molding process to provide the adequate flow of molten casting material to the interior of the die.

Referring to the top of the chassis 20 in FIG. 4, a pair of upstanding flanges 230 and 232 are provided for supporting the generally vertical film drive mounting web 50 (not shown in FIGS. 4 and 5). The mounting web 50 for the film drive mechanism is generally vertically oriented by an upstanding flange 230 at the rear of the chassis 20 and a similar flange 232 at the forward end of the chassis. A subsequently machined surface 234 is provided on each flange 230 and 232 to insure vertical alignment. Forwardly of the front flange 232 is a generally rectangular post 238 which is used to mount the leveling device of the projector which permits the front of the projector to be elevated to any particular altitude to correctly align the image on the screen.

The above described chassis directs all of the cool air first across the amplifier 74 and the transformer 70, then across the motor 76 before it reaches the fan which directs the air across the high intensity lamp. The cool air will thusly reduce the temperature of the electrical elements which tend to operate at an elevated temperture and therefore keep the overall temperature of the projector lower than previously designed models, thereby requiring much less servicing and lubricating due to the cooler operating temperature.

The foregoing detailed description has been given for clearness of understanding only and no unnecessary limitations should be understood therefrom as some modifications will be obvious to those skilled in the art.

I claim:

1. A chassis for mounting mechanical and electrical components in a projector for projecting a movie film accompanied by a sound track the projector including an electrical transformer, an audio amplifier, and a fan to direct air over a projecting light source, the chassis comprises a unitary structure including:
   a plate element defining a deck portion having upper and lower surfaces;
   means formed integral with the chassis for mounting a film drive mechanism;
   a fan mounting portion formed integral with the chassis for mounting the fan to effect the required air flow;
   means formed integral with the chassis for supporting a projector leveling device;
   a plurality of depending toothed flanges mounted on the lower surface of the deck to provide a path of air flow onto the fins adjacent the transformer and the slots adjacent the amplifier;
   an additional slot formed on the deck portion spaced from the fins to provide additional air flow onto the electrical transformer;
   a plurality of depending post means formed on the lower surface of the deck for supporting at least one cover plate below the amplifier to further control the direction of air flow;
   depending post means formed adjacent the four corners of the chassis on the lower surface of the deck portion to provide for mounting of resilient projector support feet;
   a plurality of electrical control apertures in the peripheral flange which provide access to a plurality of electrical control knobs; and
   a film guide ramp on the upper surface of the deck to guide the film after projection onto a take-up reel.

2. A chassis for mounting mechanical and electrical components in a projector for projecting a movie film accompanied by a sound track, the projector including an electrical transformer, an audio amplifier, and a fan to direct air over a projecting light source, the chassis comprises a unitary structure including:
   a plate element defining a deck portion having upper and lower surfaces;
   an integral depending peripheral flange circumscribing the deck portion defining a recessed area on the underside thereof;
   integral means for mounting the electrical transformer on the chassis;
   heat exchange means comprising a plurality of integrally formed heat conductive fins adjacent the transformer for conducting heat away from the transformer, with a plurality of slots between the fins in communication with the atmosphere to provide a path of cooling air flow past the transformer and for efficient cooling of the fins;
   Integral means for mounting the audio amplifier on the chassis;
   means for defining a plurality of slots in the chassis adjacent the amplifier to provide additional air flow across the amplifier, thereby cooling the amplifier as well as the transformer prior to the air being directed by the fan across the projecting light source; and
   a film guide ramp formed on the upper surface of the deck to guide the film after projection onto the pick-up reel.

* * * * *